(12) United States Patent
Tarver et al.

(10) Patent No.: US 11,909,457 B2
(45) Date of Patent: Feb. 20, 2024

(54) EQUALIZER DIGITAL SELF INTERFERENCE CANCELATION FOR HYBRID MIMO TRANSMITTERS

(71) Applicant: Samsung Electronics Co., Ltd., Suwon-si (KR)

(72) Inventors: Chance Tarver, Arlington, TX (US); Matthew Tonnemacher, Allen, TX (US); Khurram Muhammad, Southlake, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/818,672

(22) Filed: Aug. 9, 2022

(65) Prior Publication Data

US 2023/0046481 A1 Feb. 16, 2023

Related U.S. Application Data

(60) Provisional application No. 63/233,431, filed on Aug. 16, 2021.

(51) Int. Cl.
*H04B 17/12* (2015.01)
*H04B 17/15* (2015.01)
(Continued)

(52) U.S. Cl.
CPC .......... *H04B 17/12* (2015.01); *H04B 7/0413* (2013.01); *H04B 17/15* (2015.01); *H04L 25/03006* (2013.01)

(58) Field of Classification Search
CPC ...... H04B 17/12; H04B 17/15; H04B 7/0413; H04L 25/03006
See application file for complete search history.

(56) References Cited

U.S. PATENT DOCUMENTS 7,869,527 B2 * 1/2011 Vetter .................. H04L 27/366
375/259
9,787,459 B2 10/2017 Azadet
(Continued)

OTHER PUBLICATIONS

Abdelaziz, M., et al., "Digital Predistortion for Hybrid MIMO Transmitters", IEEE Journal of Selected Topics in Signal Processing, vol. 12, No. 3, Jun. 2018, 10 pages.
(Continued)

*Primary Examiner* — Janice N Tieu

(57) ABSTRACT

A method includes transmitting, by a transceiver configured to concurrently transmit over multiple transmit paths and receive over multiple receive paths, one or more signals, the transceiver comprising multiple transmit antennas and multiple receive antennas. The method also includes, for at least one of the multiple receive antennas: applying a transmit path model to one or more transmitted signals to generate one or more transmit path estimates, the transmit path model determined based on multiple analog power amplifiers associated with the multiple transmit paths; calculating one or more estimated self-interference (SI) signals based on the one or more transmit path estimates using an equalizer array comprising a predetermined channel model; and subtracting the one or more estimated SI signals from one or more receive signals received at the at least one receive antenna to obtain one or more residual signals.

20 Claims, 14 Drawing Sheets

(51) Int. Cl.
    *H04L 25/03*      (2006.01)
    *H04B 7/0413*     (2017.01)

(56)            References Cited

U.S. PATENT DOCUMENTS 10,714,836  B1 *   7/2020   Karabacak ........... H04B 7/0868
    11,121,737  B2     9/2021   Moorti et al.
    2007/0116108 A1 *  5/2007   Chen ................ H04L 25/03019
                                                                375/350
    2016/0323916 A1 *  11/2016  Lee ...................... H04W 76/10
    2022/0045713 A1    2/2022   Muhammad et al.
    2022/0085838 A1 *  3/2022   Kularatna ................ H03F 3/24

OTHER PUBLICATIONS

Ji, H., et al., "Extending 5G Tdd Coverage with XDD: Cross Division Duplex", IEEE Access, vol. 9, Mar. 26, 2021, 13 pages.

* cited by examiner

In MIMO, multiple transmitted DL signals will interfere with a single received UL signal.

EQUALIZER DIGITAL SELF INTERFERENCE CANCELATION FOR HYBRID MIMO TRANSMITTERS

CROSS-REFERENCE TO RELATED APPLICATIONS AND CLAIM OF PRIORITY

The present application claims priority to U.S. Provisional Patent Application No. 63/233,431 filed on Aug. 16, 2021. The content of the above-identified patent document is incorporated herein by reference.

TECHNICAL FIELD

The present disclosure relates generally to wireless communication systems and, more specifically, the present disclosure relates to an equalizer assisted digital self-interference canceler for multi-antenna systems.

BACKGROUND

Modern cellular communication systems typically operate in either Time Division Duplexing (TDD) mode or in Frequency Division Duplexing (FDD) mode to accommodate bidirectional communication. In TDD mode, the uplink (UL) and downlink (DL) operate in distinct time slots, whereas in FDD mode they operate in distinct frequency bands.

There are several key tradeoffs between TDD and FDD systems, one of which can be seen in uplink coverage. TDD systems bound uplink duration in the time domain, while FDD systems do not. With UEs having limited power, this constrains the coverage, especially as the operating bandwidth is increased. TDD systems have the advantage of not requiring large bandwidth gaps between up and downlink channels. More complicated schemes, such as cross-division duplexing (XDD), sub-band full duplex, and full-duplex (FD) systems, have provided a way in which these frequency bands can be utilized simultaneously, leveraging the benefits of both.

SUMMARY

The present disclosure relates to wireless communication systems and, more specifically, the present disclosure relates to an equalizer assisted digital self-interference canceler for a multi-antenna system.

In one embodiment, a method includes transmitting, by a transceiver configured to concurrently transmit over multiple transmit paths and receive over multiple receive paths, one or more signals, the transceiver comprising multiple transmit antennas and multiple receive antennas. The method also includes, for at least one of the multiple receive antennas: applying a transmit path model to one or more transmitted signals to generate one or more transmit path estimates, the transmit path model determined based on multiple analog power amplifiers associated with the multiple transmit paths; calculating one or more estimated self-interference (SI) signals based on the one or more transmit path estimates using an equalizer array comprising a predetermined channel model; and subtracting the one or more estimated SI signals from one or more receive signals received at the at least one receive antenna to obtain one or more residual signals.

In another embodiment, a device includes a transceiver configured to concurrently transmit one or more signals over multiple transmit paths and receive one or more receive signals over multiple receive paths, the transceiver comprising multiple transmit antennas and multiple receive antennas. The device also includes a processor operably connected to the transceiver. The processor is configured to, for at least one of the multiple receive antennas: apply a transmit path model to one or more transmitted signals to generate one or more transmit path estimates, the transmit path model determined based on multiple analog power amplifiers associated with the multiple transmit paths; calculate one or more estimated SI signals based on the one or more transmit path estimates using an equalizer array comprising a predetermined channel model; and subtract the one or more estimated SI signals from one or more receive signals received at the at least one receive antenna to obtain one or more residual signals.

In yet another embodiment, a non-transitory computer readable medium includes program code that, when executed by a processor of a device, causes the device to: control a transceiver to transmit one or more signals, the transceiver configured to concurrently transmit over multiple transmit paths and receive over multiple receive paths, the transceiver comprising multiple transmit antennas and multiple receive antennas; and for at least one of the multiple receive antennas: apply a transmit path model to one or more transmitted signals to generate one or more transmit path estimates, the transmit path model determined based on multiple analog power amplifiers associated with the multiple transmit paths; calculate one or more estimated SI signals based on the one or more transmit path estimates using an equalizer array comprising a predetermined channel model; and subtract the one or more estimated SI signals from one or more receive signals received at the at least one receive antenna to obtain one or more residual signals.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
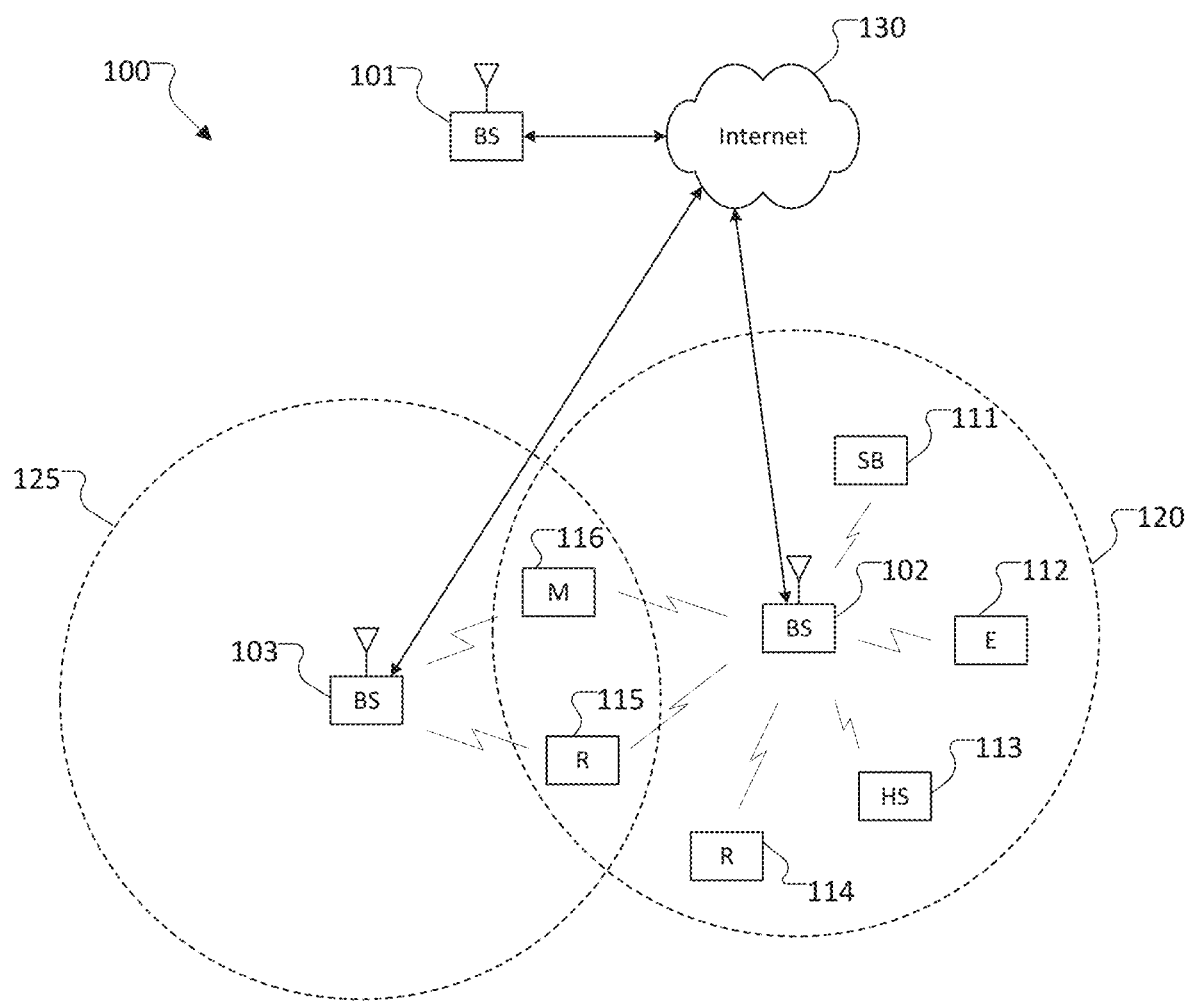
FIG. 1 illustrates an example wireless network according to embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-4B are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof for equalizer assisted digital self-interference cancelation for hybrid multi-antenna systems. In certain embodiments, and one or more of the gNBs 101-103 includes circuitry, programming, or a combination thereof for equalizer assisted digital self-interference cancelation for hybrid multi-antenna systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
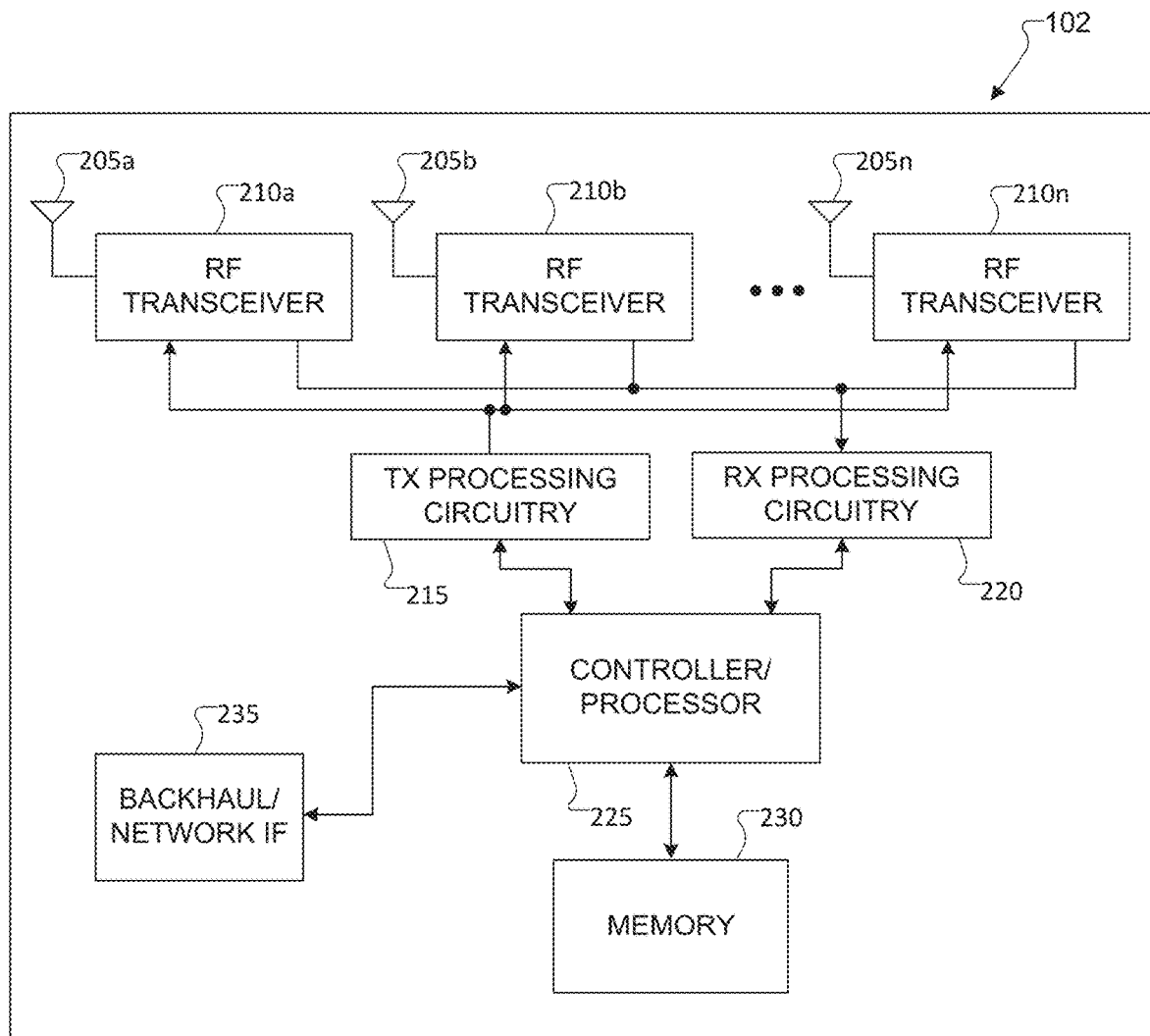
FIG. 2 illustrates an example gNB according to embodiments of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support methods for equalizer assisted digital self-interference cancelation for hybrid multi-antenna systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
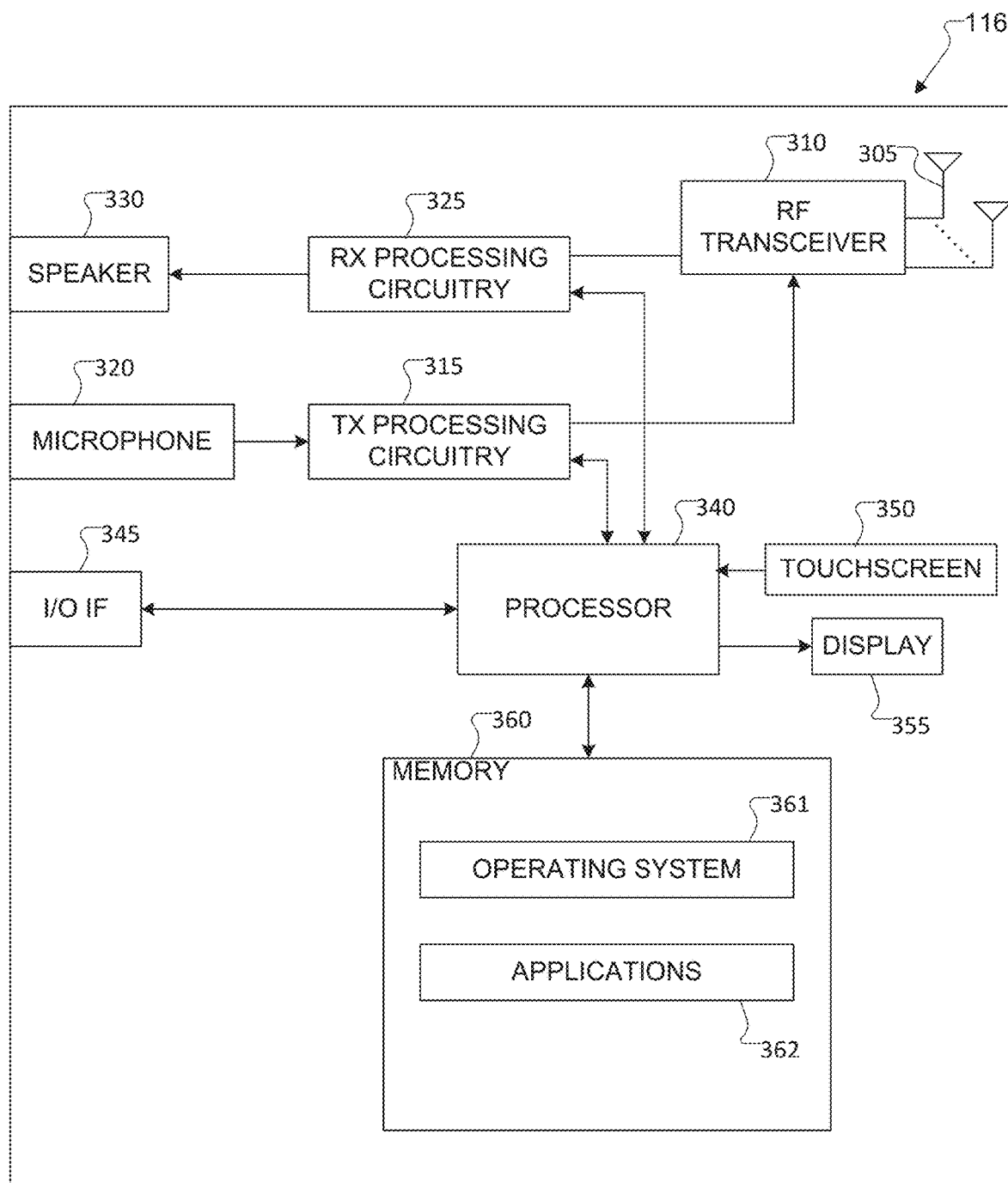
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and RX processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for equalizer assisted digital self-interference cancelation for hybrid multi-antenna systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
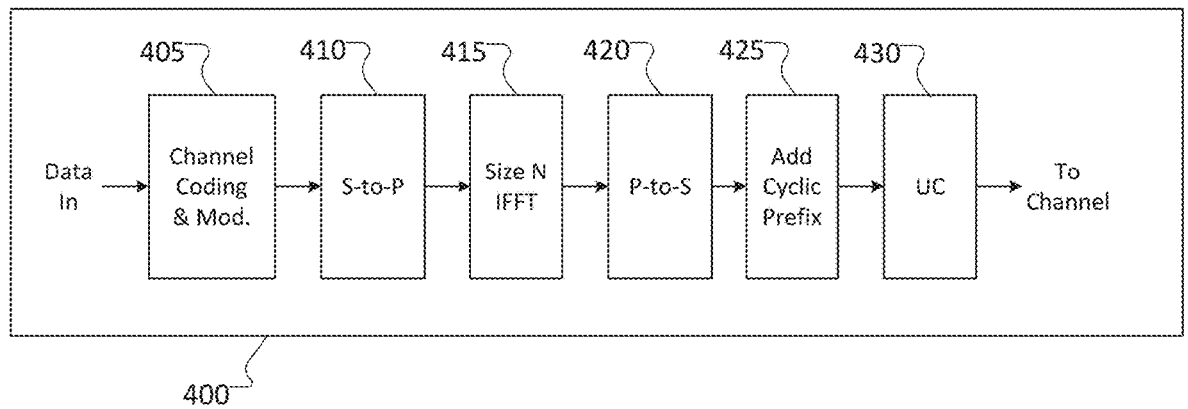
FIG. 4A illustrates a high-level diagram of an orthogonal frequency division multiple access transmit path according to embodiments of the present disclosure.
Figure 4B:
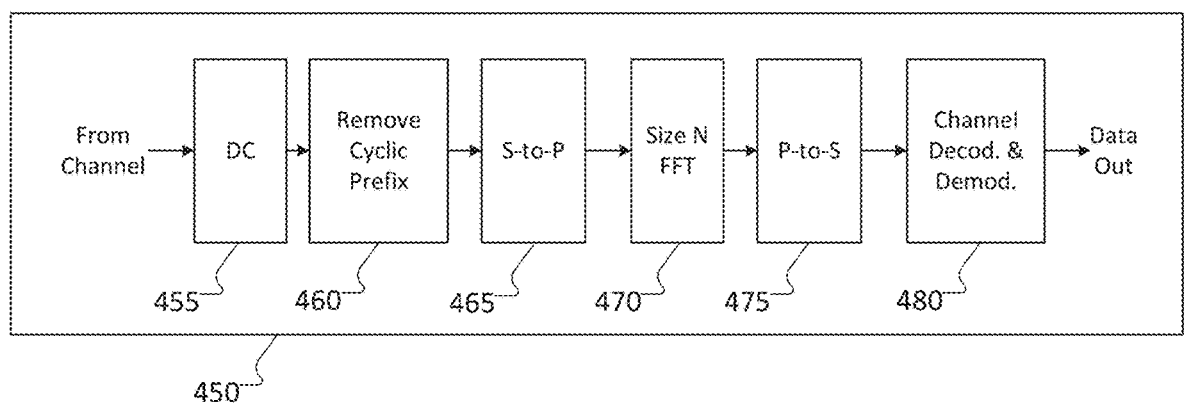
FIG. 4B illustrates a high-level diagram of an orthogonal frequency division multiple access receive path according to embodiments of the present disclosure.

FIG. 4A illustrates a high-level diagram of an orthogonal frequency division multiple access (OFDMA) transmit path 400 according to embodiments of the present disclosure. FIG. 4B illustrates a high-level diagram of an OFDMA receive path 450 according to embodiments of the present disclosure. In FIGS. 4A and 4B, for downlink communication, the transmit path 400 may be implemented in a base station (gNB) 102 or a relay station, and the receive path 450 may be implemented in a user equipment (e.g., user equipment 116 of FIG. 1). In other examples, for uplink communication, the receive path 450 may be implemented in a base station (e.g., gNB 102 of FIG. 1) or a relay station, and the transmit path 400 may be implemented in a user equipment (e.g., user equipment 116 of FIG. 1).

The transmit path 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. The receive path 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In the transmit path 400, the channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. The serial-to-parallel block 410 converts (i.e., de-multiplexes) the serial modulated symbols to parallel data to produce N parallel symbol streams where N is the IFFT/FFT size used in the gNB 102 and the UE 116. The Size N IFFT block 415 then performs an IFFT operation on the N parallel symbol streams to produce time-domain output signals. The parallel-to-serial block 420 converts (i.e., multiplexes) the parallel time-domain output symbols from the Size N IFFT block 415 to produce a serial time-domain signal. The add cyclic prefix block 425 then inserts a cyclic prefix to the time-domain signal. Finally, the up-converter 430 modulates (i.e., up-converts) the output of the add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. The down-converter 455 down-converts the received signal to baseband frequency, and the remove cyclic prefix block 460 removes the cyclic prefix to produce the serial time-domain baseband signal. The serial-to-parallel block 465 converts the time-domain baseband signal to parallel time-domain signals. The Size N FFT block 470 then performs an FFT algorithm to produce N parallel frequency-domain signals. The parallel-to-serial block 475 converts the parallel frequency-domain signals to a sequence of modulated data symbols. The channel decoding and demodulation block 480 demodulates and then decodes the modulated symbols to recover the original input data stream.

Each of gNB s 101-103 may implement a transmit path that is analogous to transmitting in the downlink to the UEs 111-116 and may implement a receive path that is analogous to receiving in the uplink from the UEs 111-116. Similarly, each one of the UEs 111-116 may implement a transmit path corresponding to the architecture for transmitting in the uplink to the gNBs 101-103 and may implement a receive path corresponding to the architecture for receiving in the downlink from the gNBs 101-103.

Figure 5:
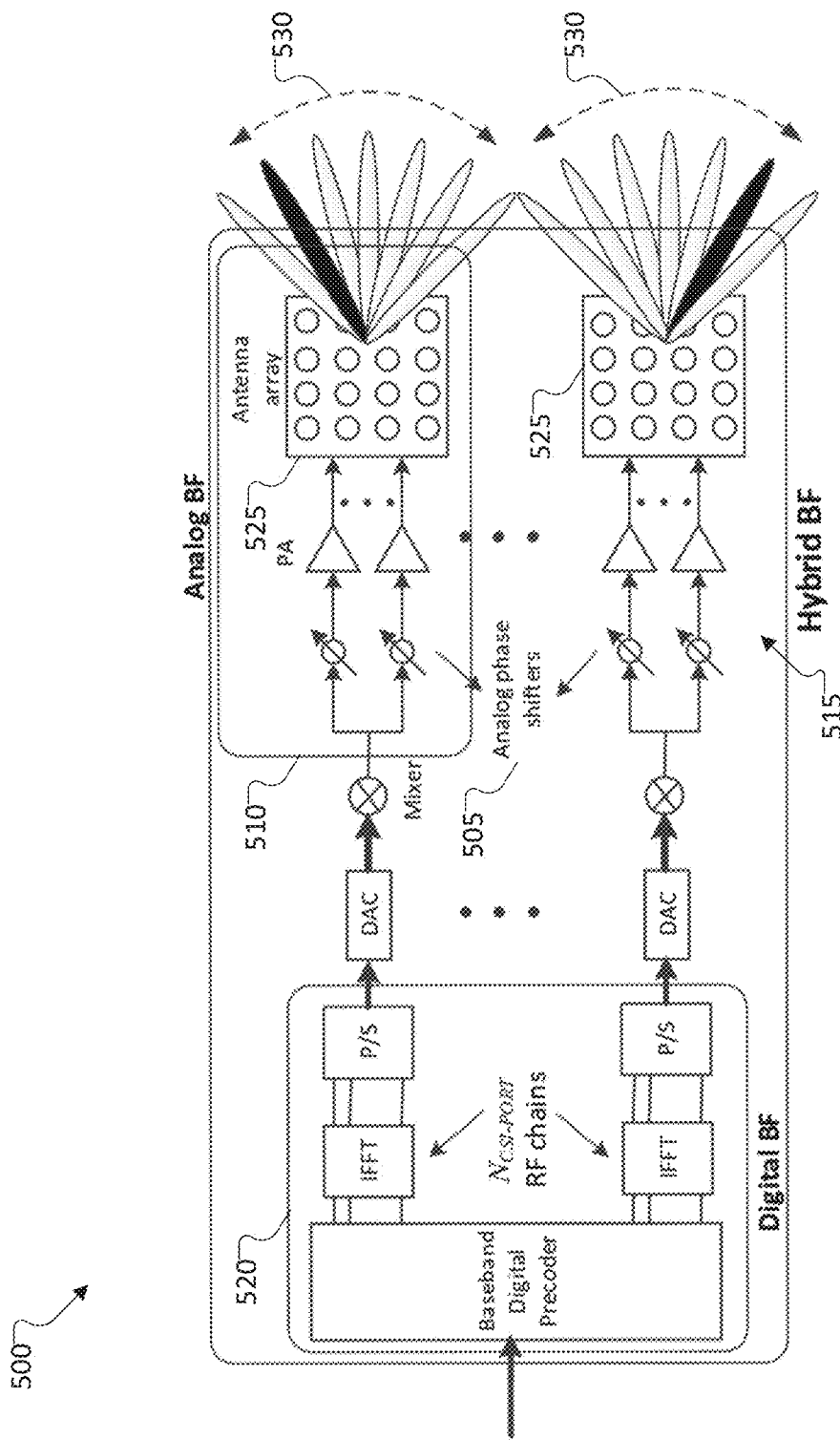
FIG. 5 illustrates an example beamforming architecture according to embodiments of the present disclosure.

FIG. 5 illustrates an example beamforming architecture 500 according to embodiments of the present disclosure. The embodiment of the beamforming architecture 500 illustrated in FIG. 5 is for illustration only. FIG. 5 does not limit the scope of this disclosure to any particular implementation of the beamforming architecture 500. In certain embodiments, one or more of gNB 102 or UE 116 can include the beamforming architecture 500. For example, one or more of antenna 205 and its associated systems or antenna 305 and its associated systems can be configured the same as or similar to the beamforming architecture 500.

Re1.14 LTE and Re1.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converts/digital-to-analog converts (ADCs/DACs at mmWave frequencies)).

In the example shown in FIG. 5, the beamforming architecture 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analog BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. The digital BF 520 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration - to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the beamforming architecture 500 is also applicable to higher frequency bands such as >52.6 GHz (also termed the FR4). In this case, the beamforming architecture 500 can employ only analog beams. Due to the O2 absorption loss around 60 GHz frequency (-10 decibels (dB) additional loss @ 100m distance), larger number of and sharper analog beams (hence larger number of radiators in the array) will be needed to compensate for the additional path loss.

Figure 6:
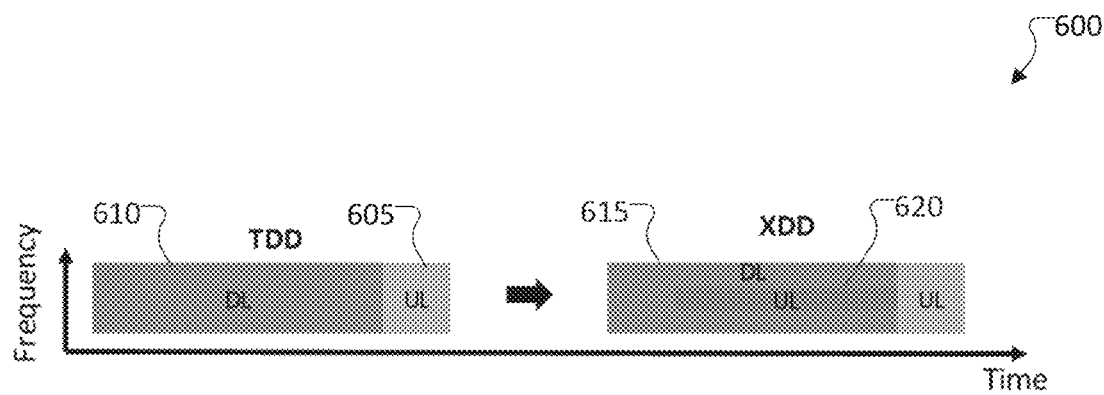
FIG. 6 illustrates examples of a TDD communication and a XDD communication according to embodiments of the present disclosure.

FIG. 6 illustrates examples of a TDD communication and a cross-division duplex (XDD) communication according to embodiments of the present disclosure. The embodiments of the TDD and XDD communications 600 shown in FIG. 6 are for illustration only. Other embodiments can be used without departing from the scope of the present disclosure.

Modern cellular communication systems typically operate in either TDD mode or in FDD mode to accommodate bidirectional communication. In TDD mode, the UL 605 and DL 610 operate in distinct time slots, whereas in FDD mode they operate in distinct frequency bands.

There are several key tradeoffs between TDD and FDD systems, one of which can be seen in uplink coverage. TDD systems bound uplink duration in the time domain, while FDD systems do not. With UEs having limited power, this constrains the coverage, especially as the operating bandwidth is increased. TDD systems have the advantage of not requiring large bandwidth gaps between up and downlink channels. More complicated schemes, such as XDD and Full-Duplex (FD) systems, have provided a way in which these frequency bands can be utilized simultaneously, leveraging the benefits of both.

In FD systems, the uplink and downlink operate in the same time/frequency resources. This duplexing ultimately leads to extreme self-interference (SI) problems, as almost all of a base station's transmitter power will appear on its uplink receiver. Moreover, there may also be significant interference from adjacent channel leakage due to power amplifiers (PA) in nearby high-power base stations operating in adjacent channels.

XDD is a new paradigm that provides a unique compromise between FDD and TDD, leveraging the benefits of both. An XDD system is one in which simultaneous downlink 615 and uplink 620 are achieved in the same contiguous band, gaining FDD benefits in an unpaired TDD band. A portion of DL is assigned to UL while the DL is operating and transmitting adjacent channel power (ACP) in the UL band. Relying on a minimal guard band between uplink and downlink usually is not possible due to the substantial adjacent channel leakage from the downlink transmitter interfering with the intended received signal.

A self-interference cancelation (SIC) technique can be used to alleviate the SI. This cancelation can be performed digitally where the system aligns and removes an estimate of the transmitted signal in the DL band from the incoming received signal in the UL band. While the system knows the original baseband waveform it transmitted, the effects of multiple analog components and a channel must be accounted for when estimating the SI. In particular, the PAs introduce extreme nonlinear distortion. Accurately modeling and applying self-interference cancelation is practically challenging, especially in MIMO systems where there may be many transmitters and receivers at the base station.

A Generalized Memory Polynomial (GMP) can be used to model a PA or its inverse for SIC and Digital Predistortion (DPD), respectively. GMPs include multiple nonlinearities and memory effects to model a device accurately. In DPD, the goal is to linearize a PA to meet a spectral mask requirement. Hence, the GMP model needs to be just large enough to accomplish this task. In XDD and FD systems, the goal is to cancel SI to the receiver noise floor, requiring higher accuracy in the model and more complexity. Moreover, to maintain SIC performance near the noise floor, GMP-based systems may employ frequent updating of the models as any device operation changes, for example, due to temperature changes, can degrade SIC performance.

Figure 7:
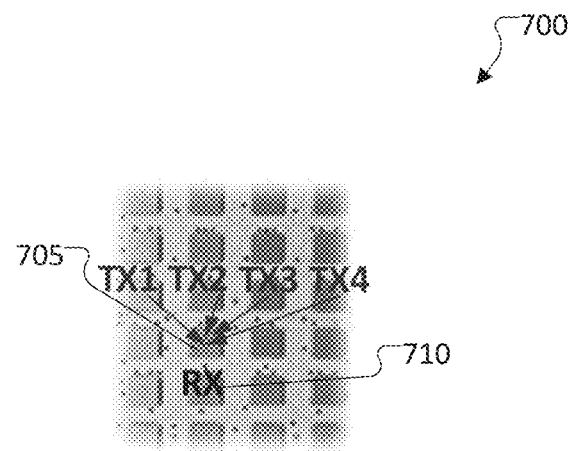
FIG. 7 illustrates an example of a multiple antenna array according to embodiments of the present disclosure.

FIG. 7 illustrates an example of a multiple antenna array 700 according to embodiments of the present disclosure. The embodiment of the multiple antenna array 700 shown in FIG. 7 is for illustration only. Other embodiments can be used without departing from the scope of the present disclosure.

In certain embodiments, an XDD system antenna includes a plurality of antenna ports comprising N transmit antennas 705 and M receive antennas 710, where M and N are integers. As shown in the example depicted in FIG. 7, in a MIMO system, multiple transmitted DL signals can interfere with a single received UL signal.

Figure 8:
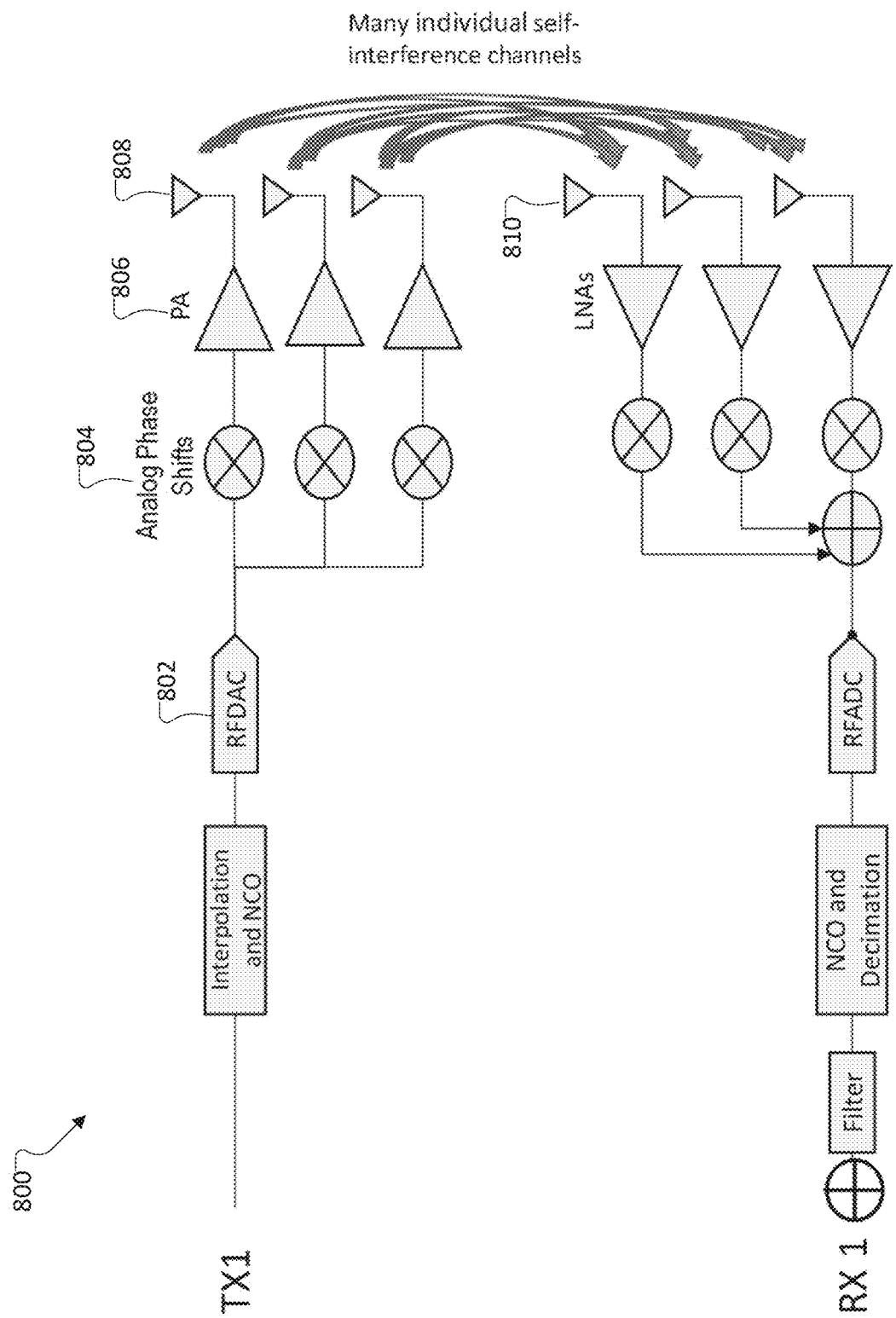
FIG. 8 illustrates an example hybrid MIMO system according to embodiments of the present disclosure.

The problem of self-interference cancelation becomes further complicated in hybrid MIMO systems, such as the example shown in FIG. 8. FIG. 8 illustrates an example hybrid MIMO system 800, where each digital to analog converter 802 is followed by an analog beamformer that splits the input to multiple analog RF chains with dedicated phase shifters 804 and PAs 806. Such a system increases the number of antennas and hence the spatial diversity and beamforming gain without a substantial increase in digital complexity. The hybrid beamforming could be used in any frequency band such as one of the sub-6 GHz frequency bands or mmWave or higher frequency bands. Generally, mmWave and higher frequency bands have more prevalent use of hybrid beam forming.

While the compromise between analog and digital beamforming in hybrid MIMO system is valuable, it makes performing SIC challenging. For example, when the hybrid MIMO system 800 operates in XDD or FD modes, the transmit signal from each transmit antenna 808 will interfere with each received signal at each receive antenna 810. Conventional SIC solutions used in single-input singleoutput (SISO) systems are not applicable because SISO-like cancelation does not consider all the paths from each antenna in the TX subarray to each RX in the RX subarray.

To address these and other issues, this disclosure provides a system and method for equalizer assisted digital selfinterference cancelation for hybrid multi-antenna systems. As described in more detail below, the disclosed embodiments mathematically model each transmit path to determine what is at each PA output, and then pass these signals through a set of equalizers that replicate the channels between the TX paths and each RX ADC.

The disclosed embodiments are capable of estimation and cancelation of self-interference in a hybrid MIMO system, with application to massive MIMO systems. The disclosed embodiments can be used in any MIMO system requiring self-interference estimation and cancelation such as full-duplex systems and mXDD systems. By having high-performance digital self-interference cancelation, such as provided by the disclosed embodiments, operators can save hardware costs due to not needing (or at least reducing the need for) analog SIC circuitry, transmitter and receiver isolation via filtering, and transmitter and receiver isolation from antenna structure design.

Note that while some of the embodiments discussed below are described in the context of hybrid MIMO systems, these are merely examples. It will be understood that the principles of this disclosure may be implemented in any number of other suitable contexts or systems.

Figure 9A:
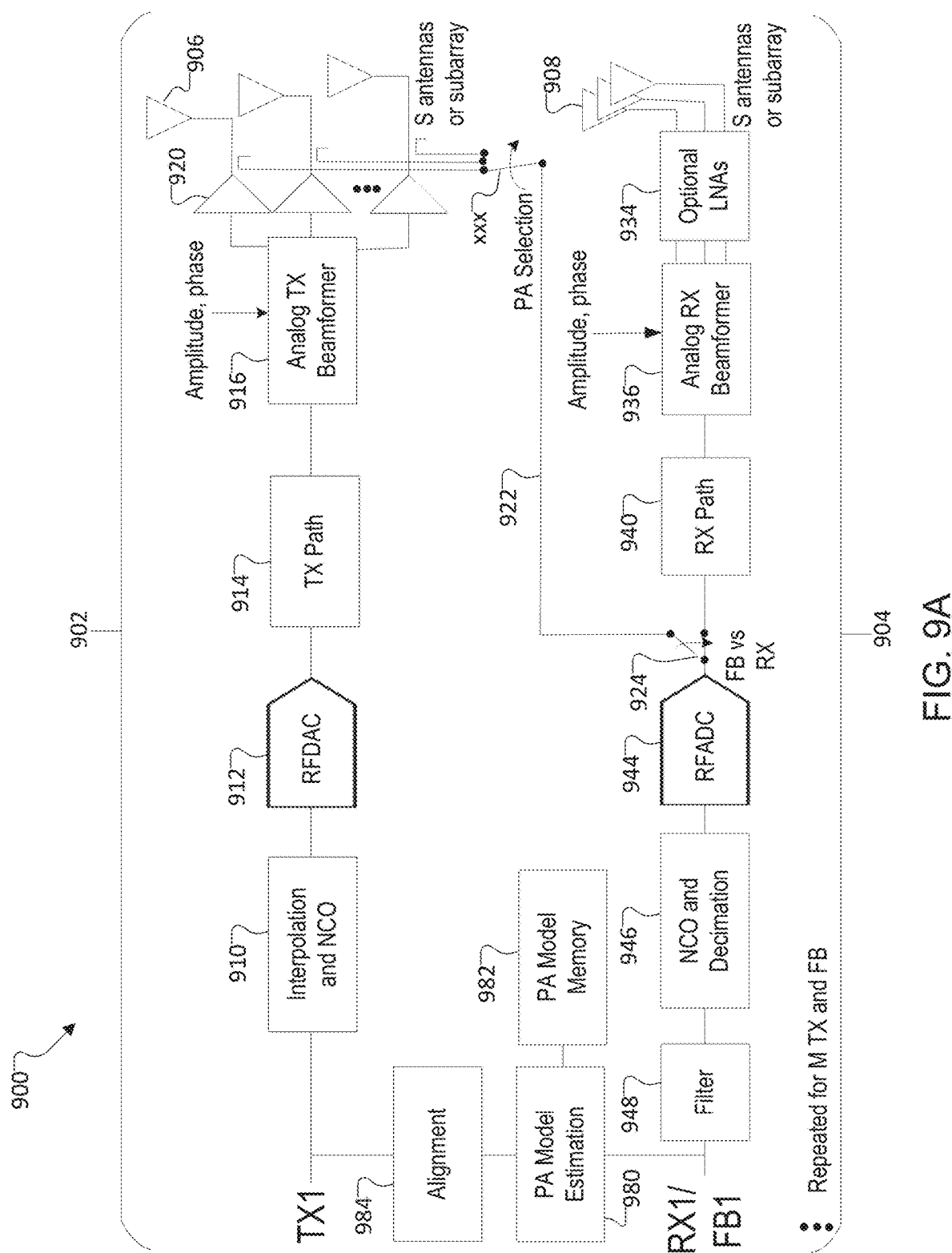
FIGS. 9A and 9B illustrate an example system in which equalizer assisted digital SIC can be performed according to embodiments of the present disclosure.
Figure 9B:
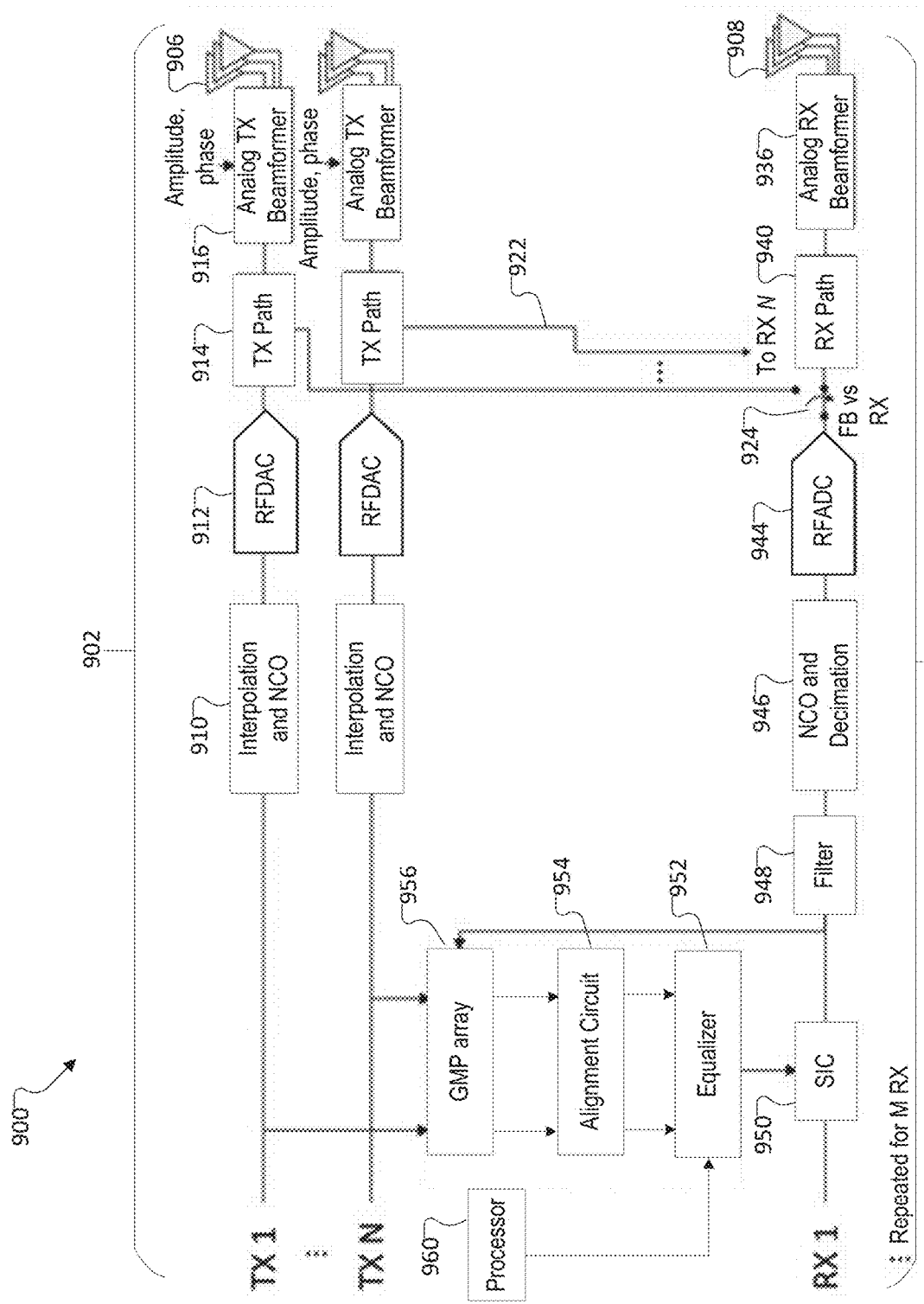

FIGS. 9A and 9B illustrate an example system 900 in which equalizer assisted digital SIC can be performed according to embodiments of the present disclosure. In particular, FIG. 9A shows the system 900 in a PA learning phase, and FIG. 9B shows the system 900 in a use phase. The embodiment of the system 900 shown in FIGS. 9A and 9B is for illustration only. Other embodiments of the system 900 could be used without departing from the scope of this disclosure.

As described in greater detail below, the system 900 can operate in multiple steps, including steps and SIC operation steps. In a TX modeling step, the system 900 learns the TX path model of the system 900, which includes one or more power amplifiers. The system also learns, in an SI channel modeling step, the channel from each TX antenna to each RX antenna by accounting for the knowledge of the analog phase shifter values. Later, in an SIC operation step, the system 900 can use the learned channel between the modeled TX path and each RX path such that a combination of TX signals transformed by the TX path model passed through the learned channel model can estimate the SI at each receiver.

As shown in FIGS. 9A and 9B, the system 900 is a hybrid MIMO array system that includes N TX subarrays 902 and M RX subarrays 904. While only one RX subarray 904 (RX1) is shown in FIGS. 9A and 9B, it will be understood that the system 900 can include additional RX subarrays. Depending on the embodiment, the values of M and N may be the same or different. Each TX subarray 902 includes S TX antennas 906 and each RX subarray 904 includes S RX antennas 908. Thus, in the system 900, there is a total of N*S TX antennas 906 separated from M*S RX antennas 908. The antennas 906, 908 may be partitioned on the same antenna panel or may be located on multiple antenna panels.

Each TX subarray 902 includes an interpolation and NCO (numerically controlled oscillation) block 910 followed by a RF digital-to-analog converter (RFDAC) 912, which converts the digital signal to analog. The output from each RFDAC 912 splits to S transmit paths 914 through an analog TX beamformer 916, which may contain one or more phase shifters and PAs with appropriate matching and isolation circuitry before connecting to a PA 920 followed by an antenna 906. Additionally, there is at least one TX feedback path 922 that can be used to capture each PA output. This is normally present for DPD learning. There is also a corresponding RX path 940 for each TX path 914. Each TX feedback path 922 is connected to a switch 924, such that the RX subarray 904 may be switched between the TX feedback path 922 and the RX path 940.

Each RX subarray 904 includes the S RX antennas 908, one or more optional low noise amplifiers (LNAs) 934, an analog RX beamformer 936 (which can include one or more phase shifters), the RX path 940, a RFADC 944 provided to convert the analog signal back to digital, one or more NCO and decimation blocks 946, and one or more filters 948.

The system 900 mathematically models each transmit path 914 to determine what is the output at each PA 920, and then passes these signals through a filter bank (i.e., a set of equalizers) that replicates the channels between the transmit paths 914 and each RFADC 944. Due to the S antenna elements 906 in the TX subarray 902 and each antenna element 908 in the RX subarray 904, there are S channels between the TX subarray 902 and a single antenna element 908 in the RX subarray 904. This is considered to be a composite channel between the TX subarray 902 and one antenna element 908 of the RX subarray 904.

In the modeling step shown in FIG. 9A, the system 900 (such as via a processor) learns a TX path model, which includes any power amplifiers and other circuitry, between each digital TX signal (such as in the TX subarray 902) and each feedback path 922. In some embodiments, this step is performed infrequently, as it is used only to model the TX paths, not any dynamic environmental effects. Additionally, the modeling step also requires the receiver (e.g., the RX path 940 and RX antennas 908) to be switched off (via the switch 924), which can be time-consuming in a communication system. The preferred model for the TX path 914 is a generalized memory polynomial (GMP). There are many other possible ways to model the TX path 914 that can combine look-up tables with simpler polynomials or a combination of connected splines or polynomials behaviorally modeling the TX response in regions of operation.

In the SIC operation step shown in FIG. 9B, the system 900 (such as via a processor) learns the channel between the modeled TX path and each RX path 940, such that a combination of TX signals (such as in the TX subarray 902) transformed by the TX path model and subsequently passed through the learned channel model can be used to estimate the SI at each receiver which is due to the TX signal leaking into the RX path 940 through the TX antennas 906 and the RX antennas 908. The system 900 learns the channel between each analog TX path 914 and each analog RX path 940 when only the lower dimensional data before the RFDACs 912 and after the RFADCs 944 are available. The estimated SI signal can then be subtracted from the received signal, leaving only the intended uplink signal.

In FIGS. 9A and 9B, TX1 is the digital representation of the transmit signal in the sampled domain. After going through any digital predistortion (DPD), interpolation, and/or frequency shifting, the signal is applied to the RFDAC 912, which converts it to an RF output signal. This RF signal passes through the TX path 914, which consists of anti-aliasing filters, driver stages, phase shifters, and power amplifiers. The analog TX beamformer 916 receives amplitude and phase information from a control system.

Being a hybrid MIMO system, the system 900 includes a split to S streams for the analog TX beamformer 916. Without loss of generality, this can be done at any point in the chain. Moreover, the exact order of the analog path can be modified without major consequence. For example, a single PA 920 could be used before the analog TX beamformer 916.

A coupler is used to extract a small power from the output of the PA 920 (generally directionally) and is digitized by the RFADC 944 after passing through filtering and/or gain (if needed). This path provides a replica of the signal at the output of the PA 920 to the RFADC 944 (or a dedicated ADC, if necessary). This signal is digitized and can be used by a PA model estimator 980 to create a model of the PA 920 for the purpose of digital SIC or the inverse model for the purpose of DPD. In some embodiments, the PA model can be stored in a PA model memory 982. An alignment circuit 984 can adjust a timing of TX1 to match the signal output from the TX path 914 and enable the PA model estimator 980 to estimate SI.

As shown in FIG. 9B, the system 900 also includes a SIC block 950. The SIC block 950 is coupled to an equalizer 952, an alignment circuit 954, and a GMP array 956. Each of these components can be implemented by hardware and/or circuitry configured to perform the respective functions. For example, each of the SIC block 950, the equalizer 952, the alignment circuit 954, and the GMP array 956 can be implemented by suitable hardware, circuitry, and processing circuitry to perform the respective functions. Additionally, each of the equalizer 952, the alignment circuit 954, and the GMP array 956 can include multiple circuits, where each of the circuits is coupled to a respective FB path 922 from each of the TX paths 914. For example, the GMP array 956 can include N filters, each coupled to a respective one of the N TX subarray 902; the alignment circuit 954 can include N alignment circuits, each coupled to a respective output of the N filters of the GMP array 956; and the equalizer 952 can include N equalizers, each coupled to a respective output of the N alignment circuits 954.

The system 900 also includes at least one processor 960. For example, the processor 960 can be the same as, or similar to, the controller/processor 225 or the processor 340. The processor 960 is configured to set or revise one or more parameters of the equalizer 952. For example, the processor 960 is configured to set one or more coefficients of an equalizer function performed or used by the equalizer 952.

In one aspect of operation, the RX paths 940 are switched to the PA feedback to learn GMP-based PA models for each transmit signal one at a time. For example, the processor 960 can operate the switch 924 to turn off the RX paths 940 and the RX antenna 908 and connect the receiver circuit to the FB path 922. In an alternative embodiment, a dedicated FB path 922 with its own RFADC could be used instead of sharing the RFADC 944. Other embodiments are also possible with K ADC paths dedicated for learning the PA models.

Individual least-squares problems are formulated, such as by the processor 960 or the GMP array 956, to learn each GMP-based PA model using the digital transmit signals and received PA feedback signals. In an alternative embodiment, a mean square or another method could be used to reduce the error between the model and the measured data.

The RX paths are switched to receive over the air transmissions for standard RX operation. For example, the processor 960 can control the switch 924 to turn on the RX path 940 and the RX antenna 908 and disconnect the receiver circuit from the FB path 922.

To estimate the self-interference (SI), the system 900 transmits a known signal on all transmitters simultaneously. For example, the system 900 transmits a first signal on all TX subarrays 902 simultaneously. The system 900 can transmit the same first signal on all TX subarrays 902, or the system 900 can transmit a different known signal on different ones of the TX subarrays 902.

The processor 960 solves a global least-squares problem, with knowledge of the analog beamformer phase shifts and weights, to jointly learn the equalizers 952. As described in greater detail below, the global least-squares problem takes into account the digital transmit signals passed through their individual PA models and the signals received from the corresponding RX subarrays 904. The equalizers 952 are modeled after the individual interference channels from each modeled transmit signal to each RX antenna 908. Each learned channel may include a variety of standard channel effects such as multi-tap effects due to multiple reflections.

Once the processor 960 learns the equalizers 952, the processor 960 can then pass the modeled transmit signals through the learned equalizers 952 in the digital domain to estimate the self-interference on each received signal. The processor 960 then applies SIC (e.g., by using the SIC block 950) or subtracts the self-interference estimate from each receiver to produce a residual signal. The residual signal corresponds to the intended uplink signal on each receiver and will have improved SINR and, consequently, improved channel capacity.

As described above, the system 900 uses a combination of modeled PA transmit signals and equalizers to cancel each received interference signal in a hybrid MIMO architecture. The following sections describe the learning and application phases in greater detail.

GMP Learning (Modeling):

Herein, the baseband equivalent transmit signal on each PA i is represented by the discrete signal $x_i[n]$ where n indexes the samples of the signal. In the modeling step, the processor 960 learns a GMP, $g_i(.)$, representing the transfer function from $x_i[l]$ to the output of the PA, $\tilde{x}_i[1]$. Let $s_i[l]$ be the baseband equivalent DAC output. Here each DAC is split into S streams, followed by a phase shift, $\delta_i$ and PA with baseband equivalent function $g_i(.)$. Hence, $x_i[n] = \delta_i s_i[l]$.

The GMP is given as Eq. 1:

$$\tilde{x}[n] = g_i(x[n]) = \sum_{p \in P_a} \sum_{v \in V_a} \alpha_{i,p,v} x[n-v] |x[n-v]|^{p-1} + \quad (1)$$

$$\sum_{p \in P_b} \sum_{v \in V_b} \sum_{l \in L_b} \alpha_{i,p,v,l} x[n-v] |x[n-v-l]|^{p-1} +$$

$$\sum_{p \in P_c} \sum_{v \in V_c} \sum_{l \in L_c} \alpha_{i,p,v,l} x[n-v] |x[n-v+l]|^{p-1}$$

The processor 960 learns the GMP coefficients via the following optimization for each transmit signal, as shown in Equation 2:

$$\alpha_i = \arg\min \|y_i[n] - g_i(x[n])\| \quad (2)$$

SIC Operation:

Once the GMP models for each transmit path have been obtained, the processor 960 learns FIR filters of length K, $h_{i,s;j,r}[k]$, that minimize the squared error between all N*S PA estimated output signals and the jth receive signal. Once learned, each FIR filter can be applied to compute the jth residual, $u_1[n]$, on each receive signal as shown in Equation 3:

$$u_j[n] = y_j[n] - \sum_{k=1}^{N} \sum_{s=1}^{S} \sum_{r=1}^{S} \beta_{j,r}(h_{i,s;j,r}[k] * \tilde{x}_{i,s}[n]) \quad (3)$$

where $y_j[n]$ represents the signal output from the filter, $\tilde{x}_{i,s}$ is the GMP output for the analog TX beamformer for DAC stream i (i.e., the index i indicates which TX subarray 902), antenna port s (i.e., the index s indicates which TX antenna 906 of the TX subarray 902), $h_{i,s;j,r}[k]$ represents the filters, and $\beta_{j,r}$ represent the analog RX beamformer for ADC j port r (i.e., the indices j and r indicate which RX subarray 904 and which RX antenna 908).

Figure 10:
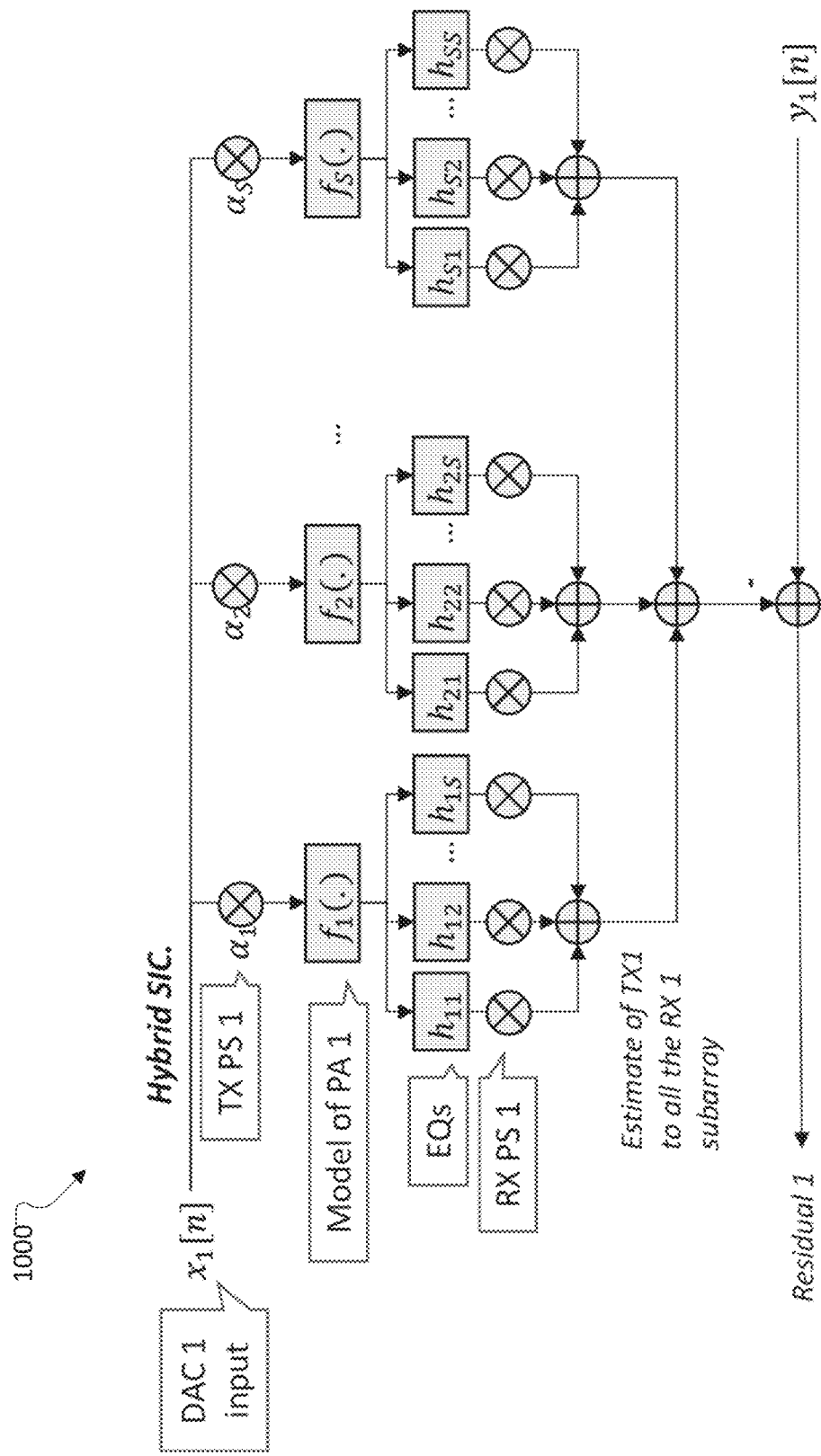
FIG. 10 illustrates an example diagram showing a SIC process according to embodiments of the present disclosure.

Each residual is the received signal vector once the SI has been removed. FIG. 10 illustrates an example diagram 1000 of this process according to embodiments of the present disclosure. As shown in FIG. 10, the diagram 1000 shows the SIC operation for one digital TX and RX with S antennas connected to each.

As discussed above, in the system 900, there are two operating modes: 1) modeling and 2) SIC operation. The modeling mode is performed infrequently to build relatively static GMP models for the system's transmit paths. While in modeling mode, the receive antennas will not be active; instead the receive ADC will capture the transmit path feedback signal. The SIC operation mode is the standard operating mode, where the channel equalizers are updated as necessary and the SIC is performed. The SIC operation mode is used while operating the communication system normally, such as transmitting and receiving user data.

Figure 11:
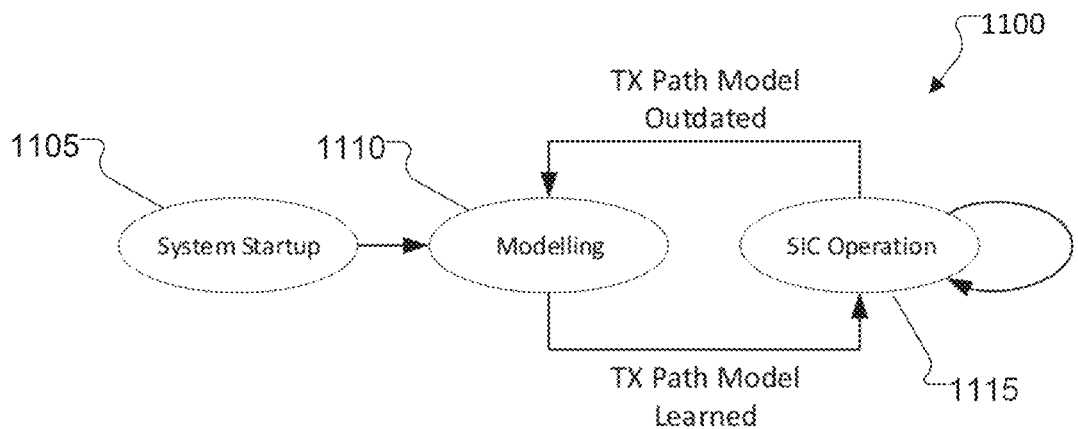
FIG. 11 illustrates a state machine for operating mode transitions according to embodiments of the present disclosure.

FIG. 11 illustrates a state machine 1100 for operating mode transitions according to embodiments of the present disclosure. The states of the state machine 1100 may represent the states of a transceiving system, such as the system 900. The embodiment of the state machine 1100 shown in FIG. 11 is for illustration only. Other embodiments could be used without departing from the scope of the present disclosure.

In operation state 1105, the system starts up. After startup, the system proceeds to modeling in the modeling state 1110. At various points, the system may switch to SIC operation in the SIC operation state 1115, as described in greater detail below.

Figure 12:
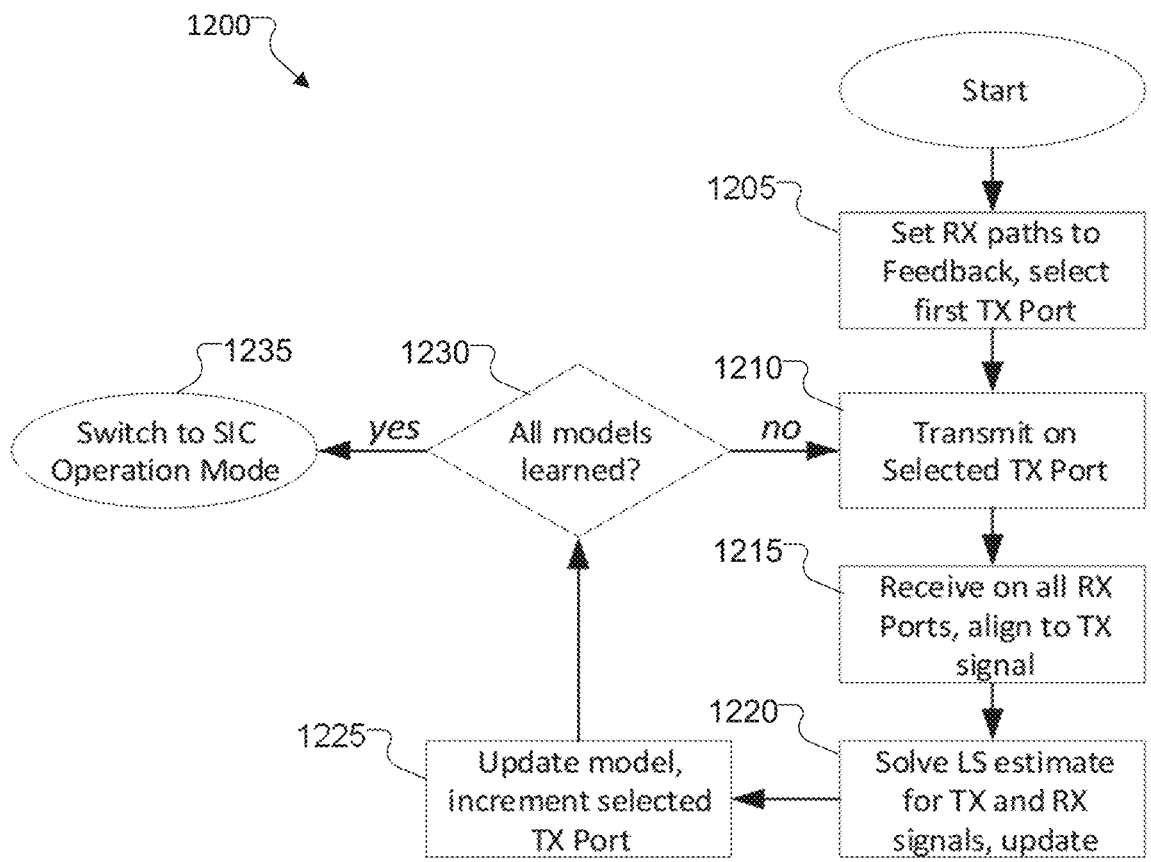
FIG. 12 illustrates a modeling process according to embodiments of the present disclosure.

FIG. 12 illustrates a modeling process 1200 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1200 depicted in FIG. 12 can be implemented by a transmitter and processor circuitry in, for example, a base station. The process 1200 can be performed, for example, by the system 900 or the gNB 102. The process 1200 can be performed in the modeling state 1110.

Figure 13:
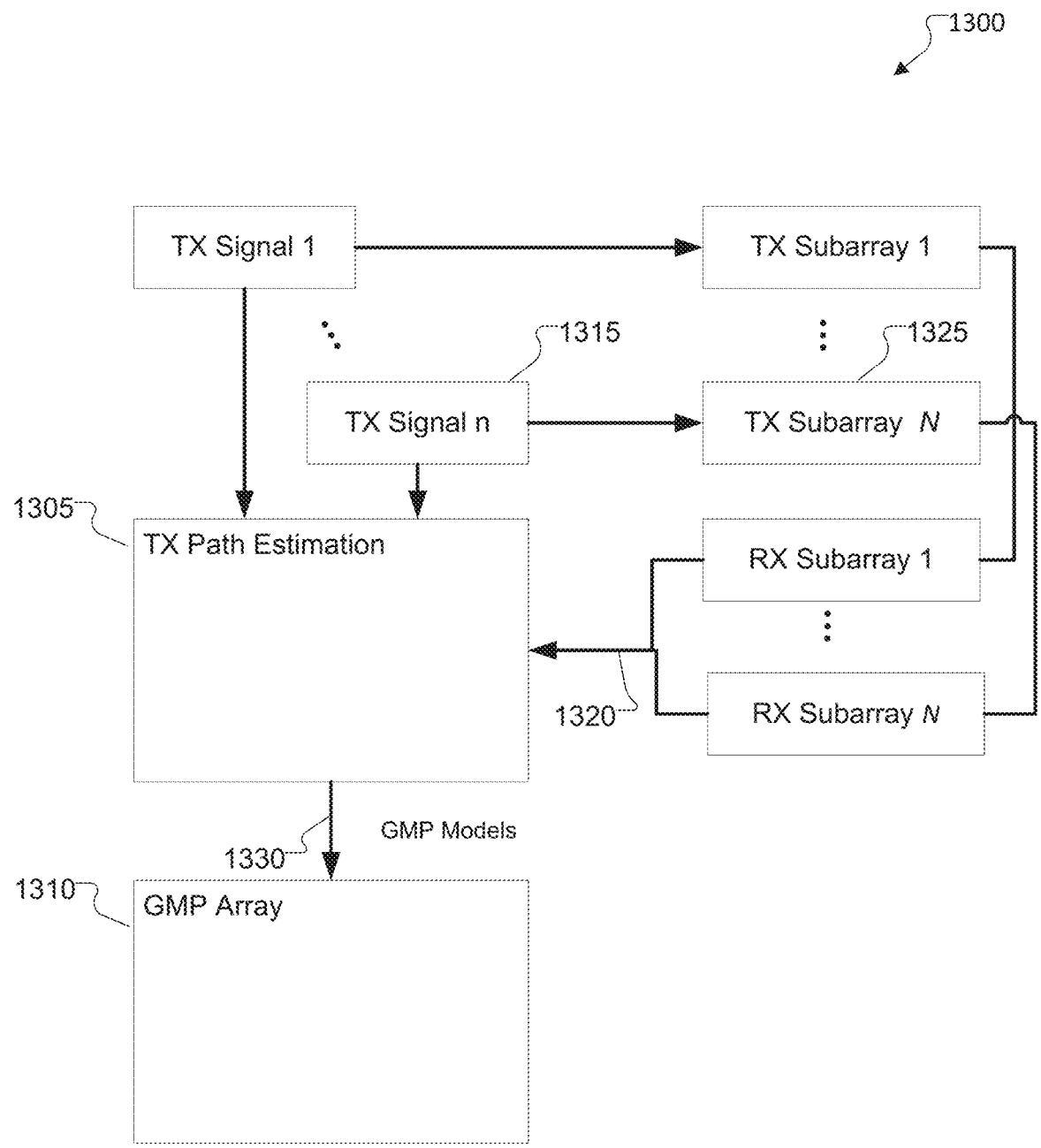
FIG. 13 illustrates an example modeling system according to embodiments of the present disclosure.

In modeling, there are two main blocks: TX Path Estimation 1305 and GMP Array 1310. FIG. 13 illustrates an example modeling system 1300 according to embodiments of the present disclosure. The embodiment of the modeling system 1300 shown in FIG. 13 is for illustration only. Other embodiments could be used without departing from the scope of the present disclosure. In certain embodiments, one or more processors, such as the processor 960, performs one or more functions of one or more of the TX Path Estimation 1305 and the GMP Array 1310.

In operation 1205, the receiver paths are set to a feedback mode. That is, the processor 960 operates the switch 924 to turn off the RX path 940 and the RX antenna 908. The switch 924 is operated to select a first feedback path 922. In operation 1210, the processor 960 transmits a first signal (TX signal) on the selected TX port. In operation 1215, a second signal (RX signal) is received on all RX ports. The second signals are aligned to the first signal.

In operation 1220, a solution for a least squares (LS) estimate for the TX and RX signals is obtained. The TX Path Estimation 1305 obtains the digital TX signals 1315 and RX subarray signals 1320. The TX Path Estimation 1305 uses each digital TX signal 1315 and each RX subarray signal 1320 to create a transmit path model that can transform the digital transmit signal 1315 into an estimate of the signal at the output of the TX subarray 1325. The TX Path Estimation 1305 generates GMP models for each TX subarray 1325. In certain embodiments, the transmit path model is created by estimating a number of non-linear components, each of the non-linear components corresponding to a respective transmit path for the first number of transmit antennas; and calculate one or more coefficients of the equalizer function by calculating a number of coefficients for the equalizer function for each of the second number of receive antennas. That is, the transmit path model is configured to model the non-linear component corresponding to the first transmit path in the transceiver using one or more of: a generalized memory polynomial (GMP), a simplified MP, dividing operating regions into sections, or a hybrid scheme using a look-up table and lower order polynomials.

The GMP Array 1310 receives the GMP models 1330 output by the TX Path Estimation 1305. In the modeling mode, the GMP Array 1310 inputs the generated GMP models for each TX subarray 1325 and stores them for use in the SIC Operation Mode, in the SIC operation state 1115. Therefore, N TX subarrays 1325 contain N GMP models 1330, one for each PA.

In operation 1225, the transmit path model is updated and the TX port is incremented. In operation 1230, it is determined whether all models have been learned. For example, the processor 960 can determine whether a model has been learned for each transmitter with respect to each receiver. If it is determined that all transmit path models have not been learned, the process proceeds to operation 1210. If it is determined that all transmit path models have been learned, the process proceeds to operation 1235 to switch to the SIC Operation Mode.

The purpose of the modeling mode is to learn the TX model (including the PA) such that the digitally transmitted signals can be passed through the TX model to produce a close replica of the TX Path output. This transform model can be used to account for any number of RF operations in the transmit path, including filters, mixers (if used in a conventional TX), power amplifiers, and the like, which add nonlinearity. The modeling mode requires that either a dedicated FB path 922 converts the signal at PA output to digital form, or that some resources in the receiver are reused, such as one or more stages of amplifiers and filters to be connected to the coupler at the PA output. In this case, the receiver will be used to digitize the feedback signal at the PA coupler. In certain embodiments, the RX is reconfigured to normal mode where it accesses the RX signal at the antenna.

To learn each transmit path model, the TX Path Estimation block will transmit through a single TX path at a time, then formulate an LS problem to map the digital transmit signal to the received TX path output signal. This process is repeated for each TX path. The coefficients learned from each LS fit are then passed to the GMP Array 1310, where they are stored for use in SIC Operation Mode. This step learns the nonlinear model of each TX path.

Figure 14:
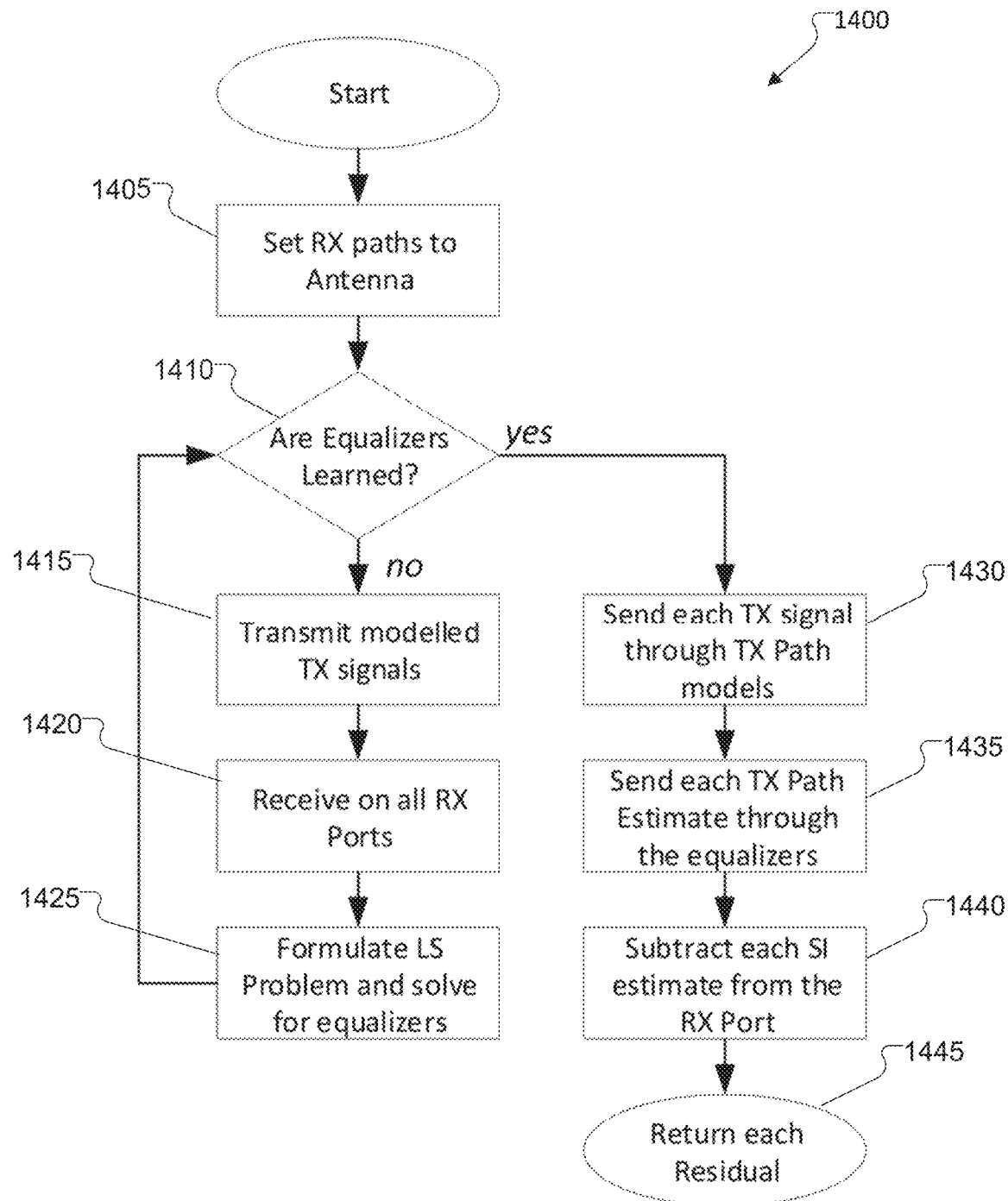
FIG. 14 illustrates an example process for self-interference cancelation according to embodiments of the present disclosure.

SIC Operation:

FIG. 14 illustrates an example process 1400 for self-interference cancelation according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 1400 can be implemented by a transmitter and processor circuitry in, for example, a base station. For example, the process 1400 can be performed by the system 900 or the gNB 102. The process 1400 can be performed in the SIC operation state 1115.

After learning the PA model, the channels between each TX path output signal and each RX signal are learned. This step is performed to be able to reproduce the TX leakage in the RX for the purpose of SIC.

Figure 15:
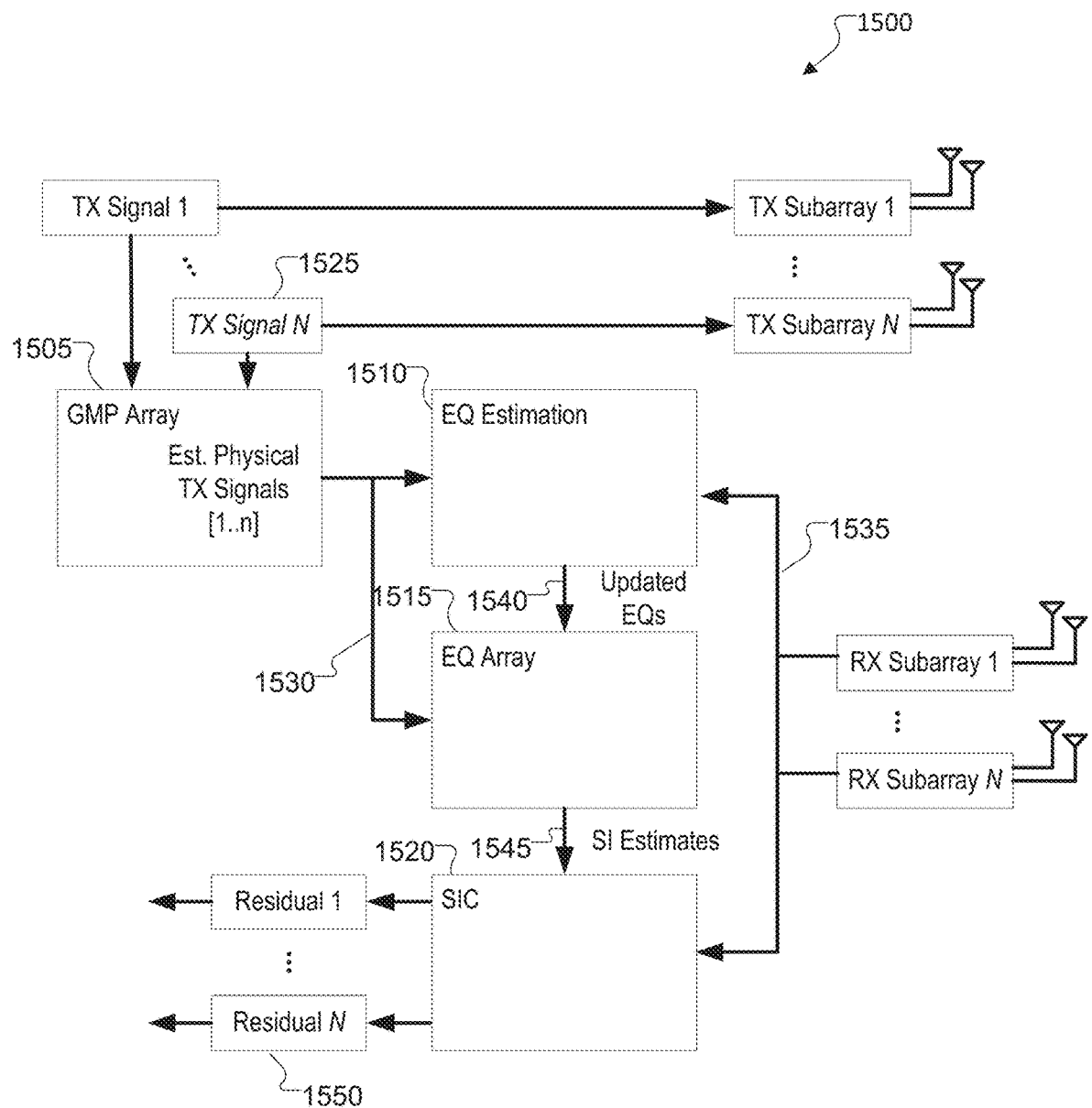
FIG. 15 illustrates an example SIC operation framework according to embodiments of the present disclosure.

In SIC Operation, there are four main blocks: GMP array 1505, Equalizer (EQ) Estimation 1510, EQ Array 1515, and SIC block 1520. FIG. 15 illustrates an example SIC operation framework 1500 according to embodiments of the present disclosure. The embodiment of the SIC operation framework 1500 shown in FIG. 15 is for illustration only. Other embodiments could be used without departing from the scope of the present disclosure. One or more components illustrated in FIG. 15 may correspond to one or more components in FIGS. 9A, 9B, and 13. For example, the GMP array 1505 can be the same as, or similar to, the GMP array 956 or the GMP array 1310; the EQ Estimation 1510 and the EQ Array 1515 can be the same as, or similar to, the equalizer 952; and the SIC block 1520 can be the same as, or similar to, the SIC block 950. In certain embodiments, one or more processors, such as the processor 960, performs one or more functions of one or more of the GMP array 1505, the EQ Estimation 1510, the EQ Array 1515, and the SIC block 1520.

In operation 1405, the RX path and RX antenna are coupled to the receiver. For example, the processor 960 can operate the switch 924 to turn on the RX path 940 and the RX antenna 908. Upon entering the SIC Operation Mode from the modeling mode, the RX Paths need to be switched such that they are connected to the receive antennas rather than the feedback from TX Path. Additionally, before SIC can be performed, the equalizers need to be learned. In operation 1410, a determination is made regarding whether all the equalizers have been learned. If all the equalizers have not yet been learned, the process proceeds to operation 1415 in which, to learn the coefficients for each equalizer, the system first broadcasts modeled transmit signals on all transmitters in the array. In operation 1420, the transmit signals are received on all RX ports. The transmit signals are fed through the GMP array 1505, such that the resulting transformed signals capture all the nonlinearities created by the power amplifier and/or other components in the transmit path. In operation 1425, all transformed transmit signals and RX paths are sent to the EQ Estimation 1510, where a least squares estimation is performed to jointly learn equalizers from each TX path (using the digitally transformed signals) to each RX path. Each equalizer here is a learned interference channel between each transformed transmit signal to each received signal. Once each equalizer is learned through the LS, the EQ Array 1515 is updated.

If the equalizers have all been learned, the process 1400 proceeds to the application phase. During the application phase, all the transformed transmit signals are passed through each of the equalizers and linearly combined to create a total estimated self-interference (SI) signal for each RX port. That is, in operation 1430, each TX signal is sent through the TX path model. The GMP array 1505 inputs digital TX signals 1525 and outputs digital (feedback) signals 1530 that reflect the modeled transmitter path. The models themselves are learned in the modeling mode. In operation 1435, each TX path estimate is sent through the equalizers (EQ Array 1515). The EQ Estimation 1510 inputs both FB signals 1530 and RX signals 1535, estimates the channel transformation (equalizer) between each FB signal 1530 and RX signal 1535, and outputs the ensemble of learned equalizers 1540. The EQ Array 1515 inputs FB signals 1530 and outputs an SI Estimate 1545 for each RX signal. In operation 1440, each SI estimate is subtracted from the RX port and each residual signal is output in operation 1445. The SIC block 1520 subtracts each input SI Estimate 1545 from each RX signal and outputs the interference-free RX signals, which are residuals 1550. That is, the SI signals are passed to the SIC block 1520 where the SI Estimate for each RX signal is subtracted out. The SIC block 1520 then returns the residuals where the SI signals have been removed. The residual leftover contains only the uplink signal with an improved SINR.

In certain embodiments, the transceiver includes conventional TX and RX with baseband filters, up/down-conversion mixers, drivers/LNA, local oscillator (LO) path with PLL. In certain embodiments, the hybrid GMP/Equalizer transceiver uses computational simplifications of the estimators, such as Mean Square (LMS) instead of recursive least squares (LS). Certain embodiments use simplifications of the GMP, such as by using MP or dividing operating region into sections in which each section can use a simplified lower complexity GMP or MP, or hybrid schemes that use LUT and lower polynomials orders. In certain embodiments, the equalizer is configured to provide real-time output at speed, while computation of equalizer can be done in a processor. In certain embodiments, the PA model is updated if it is expected to change, such as due to change in temperature. In certain embodiments, the channel equalizer is updated by calculating it again, if it is expected to have changed for some reason.

In certain embodiments, one PA can be used for each analog beamformer system instead of S PAs. In certain embodiments, the equalizers can be calculated without knowledge of the phase shift. In this case, the learned equalizers become a function of the analog beamformer used and could be retrained for new analog beamformer configurations. However, the operating complexity could be reduced as the individual TX/RX paths in the analog beamformer can be neglected in favor of a combined model.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
transmitting, by a transceiver configured to concurrently transmit over multiple transmit paths and receive over multiple receive paths, one or more signals, the transceiver comprising multiple transmit antennas and multiple receive antennas; and
for at least one of the multiple receive antennas:
applying a transmit path model to one or more transmitted signals to generate one or more transmit path estimates, the transmit path model determined based on multiple analog power amplifiers associated with the multiple transmit paths;

calculating one or more estimated self-interference (SI) signals based on the one or more transmit path estimates using an equalizer array comprising a predetermined channel model; and subtracting the one or more estimated SI signals from one or more receive signals received at the at least one receive antenna to obtain one or more residual signals, wherein the equalizer array is determined by applying the transmit path model to multiple digital transmit signals to generate multiple modeled digital signals, receiving second receive signals by the multiple receive antennas, and performing an estimation using the modeled digital signals and the second receive signals to learn multiple equalizers comprising the equalizer array.

2. The method of claim 1, wherein the one or more SI signals are configured to reduce SI caused by the one or more transmitted signals leaking into at least one of the multiple receive paths of the transceiver.

3. The method of claim 1, further comprising:
determining the transmit path model, comprising:
switching the receive paths to a feedback mode;
transmitting a first signal on a selected transmit port;
receiving second signals on multiple receive ports, wherein the second signals are aligned to the first signal; and
performing a second estimation using the first signal and the second signals to learn a portion of the transmit path model corresponding to the selected transmit port.

4. The method of claim 1, wherein:
the transceiver is part of a hybrid multiple-input multiple-output (MIMO) system; and
the multiple transmit paths are grouped into subarrays, each subarray associated with one radio frequency digital-to-analog converter (RFDAC), multiple analog phase shifters, and a subset of the multiple analog power amplifiers.

5. The method of claim 4, wherein a channel between each transmit path and each receive path is determined based on information associated with one or more analog phase shifter values.

6. The method of claim 1, wherein the transmit path model models at least one non-linear component corresponding to the at least one of the multiple transmit paths using one or more of: a generalized memory polynomial (GMP), a simplified MP, dividing operating regions into sections, or a hybrid scheme using a look-up table and lower order polynomials.

7. The method of claim 1, wherein the estimation comprises a least squares estimation.

8. A device comprising:
a transceiver configured to concurrently transmit one or more signals over multiple transmit paths and receive one or more receive signals over multiple receive paths, the transceiver comprising multiple transmit antennas and multiple receive antennas; and
a processor operably connected to the transceiver, the processor configured to:
determine an equalizer array comprising a predetermined channel model; and
for at least one of the multiple receive antennas:
apply a transmit path model to one or more transmitted signals to generate one or more transmit path estimates, the transmit path model determined based on multiple analog power amplifiers associated with the multiple transmit paths;
calculate one or more estimated self-interference (SI) signals based on the one or more transmit path estimates using the equalizer array; and
subtract the one or more estimated SI signals from one or more receive signals received at the at least one receive antenna to obtain one or more residual signals, wherein to determine the equalizer array, the processor is configured to apply the transmit path model to multiple digital transmit signals to generate multiple modeled digital signals, receive second receive signals by the multiple receive antennas, and perform an estimation using the modeled digital signals and the second receive signals to learn multiple equalizers comprising the equalizer array.

9. The device of claim 8, wherein the one or more SI signals are configured to reduce SI caused by the one or more transmitted signals leaking into at least one of the multiple receive paths of the transceiver.

10. The device of claim 8, wherein the processor is further configured to:
determine the transmit path model, wherein to determine the transmit path model, the processor is configured to:
switch the receive paths to a feedback mode;
transmit a first signal on a selected transmit port;
receive second signals on multiple receive ports, wherein the second signals are aligned to the first signal; and
perform a second estimation using the first signal and the second signals to learn a portion of the transmit path model corresponding to the selected transmit port.

11. The device of claim 8, wherein:
the device is part of a hybrid multiple-input multiple-output (MIMO) system; and
the multiple transmit paths are grouped into subarrays, each subarray associated with one radio frequency digital-to-analog converter (RFDAC), multiple analog phase shifters, and a subset of the multiple analog power amplifiers.

12. The device of claim 11, wherein a channel between each transmit path and each receive path is determined based on information associated with one or more analog phase shifter values.

13. The device of claim 8, wherein the transmit path model models at least one non-linear component corresponding to the at least one of the multiple transmit paths using one or more of: a generalized memory polynomial (GMP), a simplified MP, dividing operating regions into sections, or a hybrid scheme using a look-up table and lower order polynomials.

14. The device of claim 8, wherein the estimation comprises a least squares estimation.

15. A non-transitory computer readable medium comprising program code that, when executed by a processor of a device, causes the device to:
control a transceiver to transmit one or more signals, the transceiver configured to concurrently transmit over multiple transmit paths and receive over multiple receive paths, the transceiver comprising multiple transmit antennas and multiple receive antennas;
determine an equalizer array comprising a predetermined channel model; and
for at least one of the multiple receive antennas:
apply a transmit path model to one or more transmitted signals to generate one or more transmit path estimates, the transmit path model determined based on multiple analog power amplifiers associated with the multiple transmit paths;

calculate one or more estimated self-interference (SI) signals based on the one or more transmit path estimates using the equalizer array; and subtract the one or more estimated SI signals from one or more receive signals received at the at least one receive antenna to obtain one or more residual signals, wherein to determine the equalizer array, the program code causes the device to apply the transmit path model to multiple digital transmit signals to generate multiple modeled digital signals, receive second receive signals by the multiple receive antennas, and perform an estimation using the modeled digital signals and the second receive signals to learn multiple equalizers comprising the equalizer array.

16. The non-transitory computer readable medium of claim 15, wherein the one or more SI signals are configured to reduce SI caused by the one or more transmitted signals leaking into at least one of the multiple receive paths of the transceiver.

17. The non-transitory computer readable medium of claim 15, further comprising program code that, when executed by the processor of the device, causes the device to:

determine the transmit path model, wherein to determine the transmit path model, the device is configured to:
switch the receive paths to a feedback mode;
transmit a first signal on a selected transmit port;
receive second signals on multiple receive ports, wherein the second signals are aligned to the first signal; and
perform a second estimation using the first signal and the second signals to learn a portion of the transmit path model corresponding to the selected transmit port.

18. The non-transitory computer readable medium of claim 15, wherein:
the device is part of a hybrid multiple-input multiple-output (MIMO) system; and
the multiple transmit paths are grouped into subarrays, each subarray associated with one radio frequency digital-to-analog converter (RFDAC), multiple analog phase shifters, and a subset of the multiple analog power amplifiers.

19. The non-transitory computer readable medium of claim 18, wherein a channel between each transmit path and each receive path is determined based on information associated with one or more analog phase shifter values.

20. The non-transitory computer readable medium of claim 15, wherein the estimation comprises a least squares estimation.

* * * * *